United States Patent [19]
Hall

[11] Patent Number: 5,504,579
[45] Date of Patent: Apr. 2, 1996

[54] MULTIOSCILLATOR WITH COMBINED OPTICAL AND ELECTRONIC SIGNAL PROCESSING

[75] Inventor: David B. Hall, La Crescenta, Calif.

[73] Assignee: Litton Systems, Inc., Woodland Hills, Calif.

[21] Appl. No.: 200,826

[22] Filed: Feb. 23, 1994

[51] Int. Cl.⁶ ........................................................ G01B 9/02
[52] U.S. Cl. ........................................................ 356/350
[58] Field of Search ............................................ 356/350

[56] References Cited

U.S. PATENT DOCUMENTS 4,449,824  5/1984  Matthews .
5,116,132  5/1992  Mitchell et al. .

Primary Examiner—Samuel A. Turner
Assistant Examiner—Robert Kim
Attorney, Agent, or Firm—Elliott N. Kramsky

[57] ABSTRACT

An output system for a multioscillator includes a mixture of optical and electronic subsystems for separating and deriving the a.c. and d.c. HET signals of the right and left circularly polarized modes. An output prism includes a plurality of optical coatings for introducing predetermined phase shifts between the s and p components of light derived from the beams that counterpropagate within the cavity. A pair of polarizers receive the output beams from the prism. Predetermined orientations of the polarizers provide differential intensities for the HET outputs of right and left circularly polarized light, thereby enabling photodetectors to generate electrical signals representative of the a.c. and d.c. HET outputs of left or right circularly polarized light. An output circuit includes high and low-pass filters for separating the a.c. and d.c. HET signals for each polarization.

32 Claims, 4 Drawing Sheets

FIG. 1
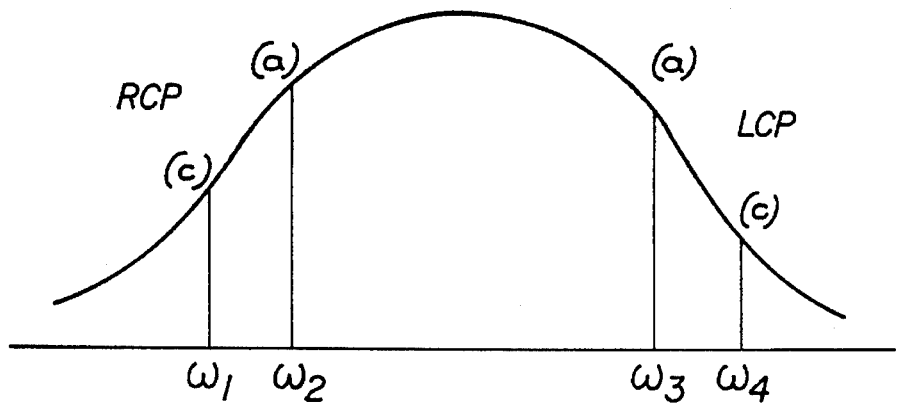
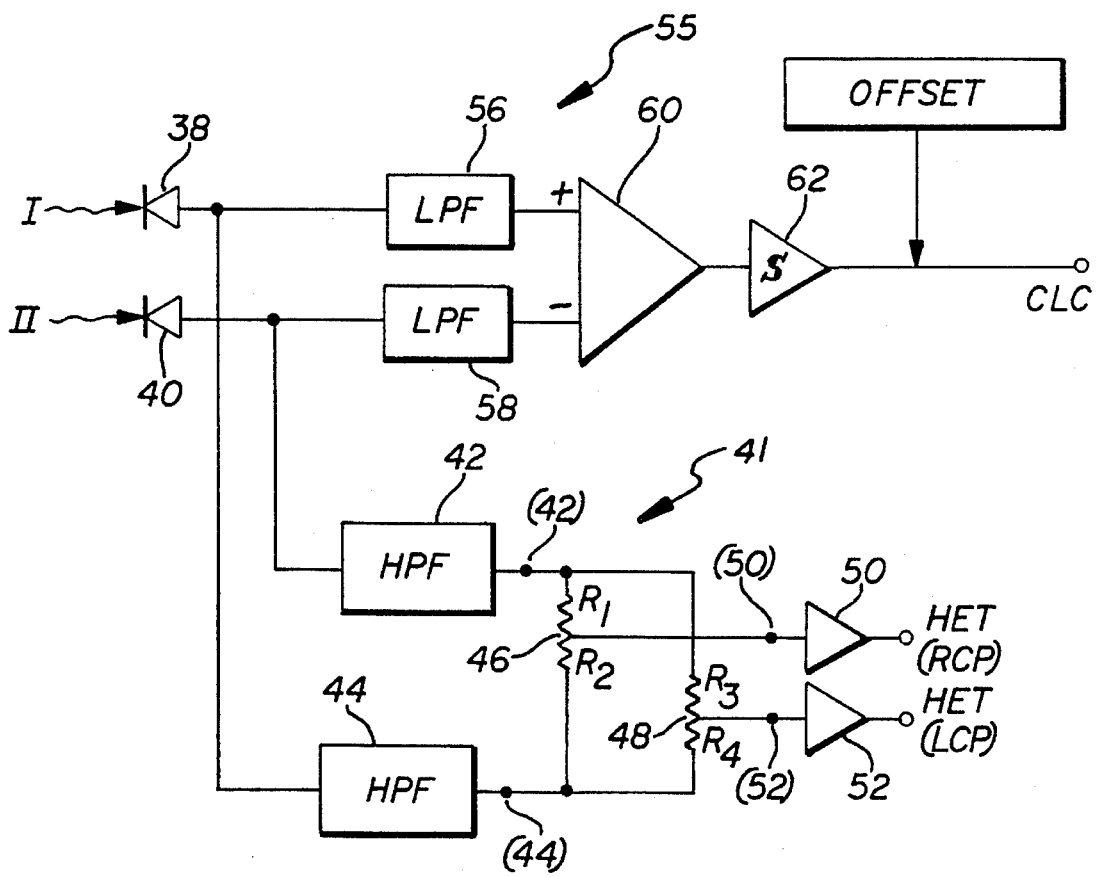
FIG. 6

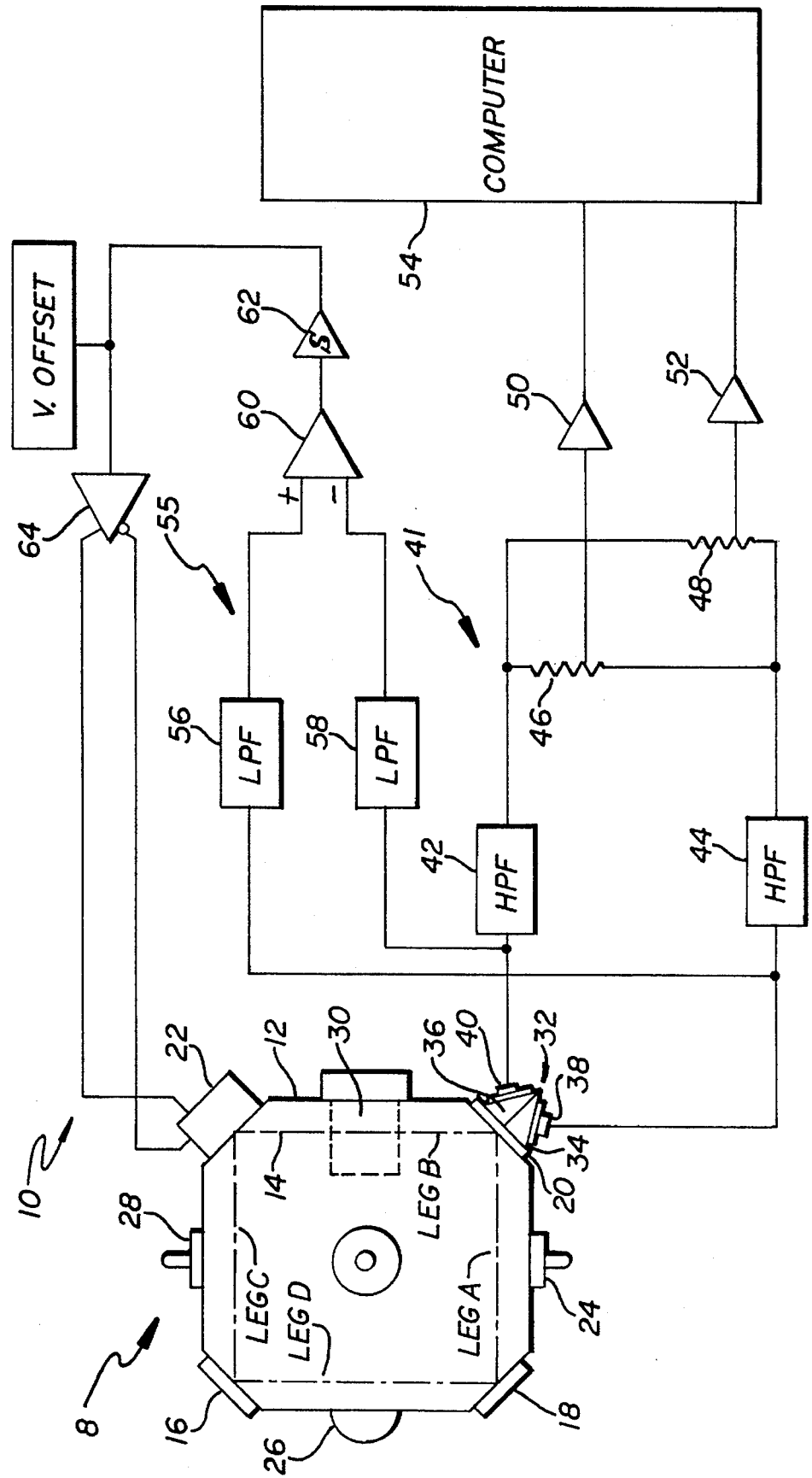

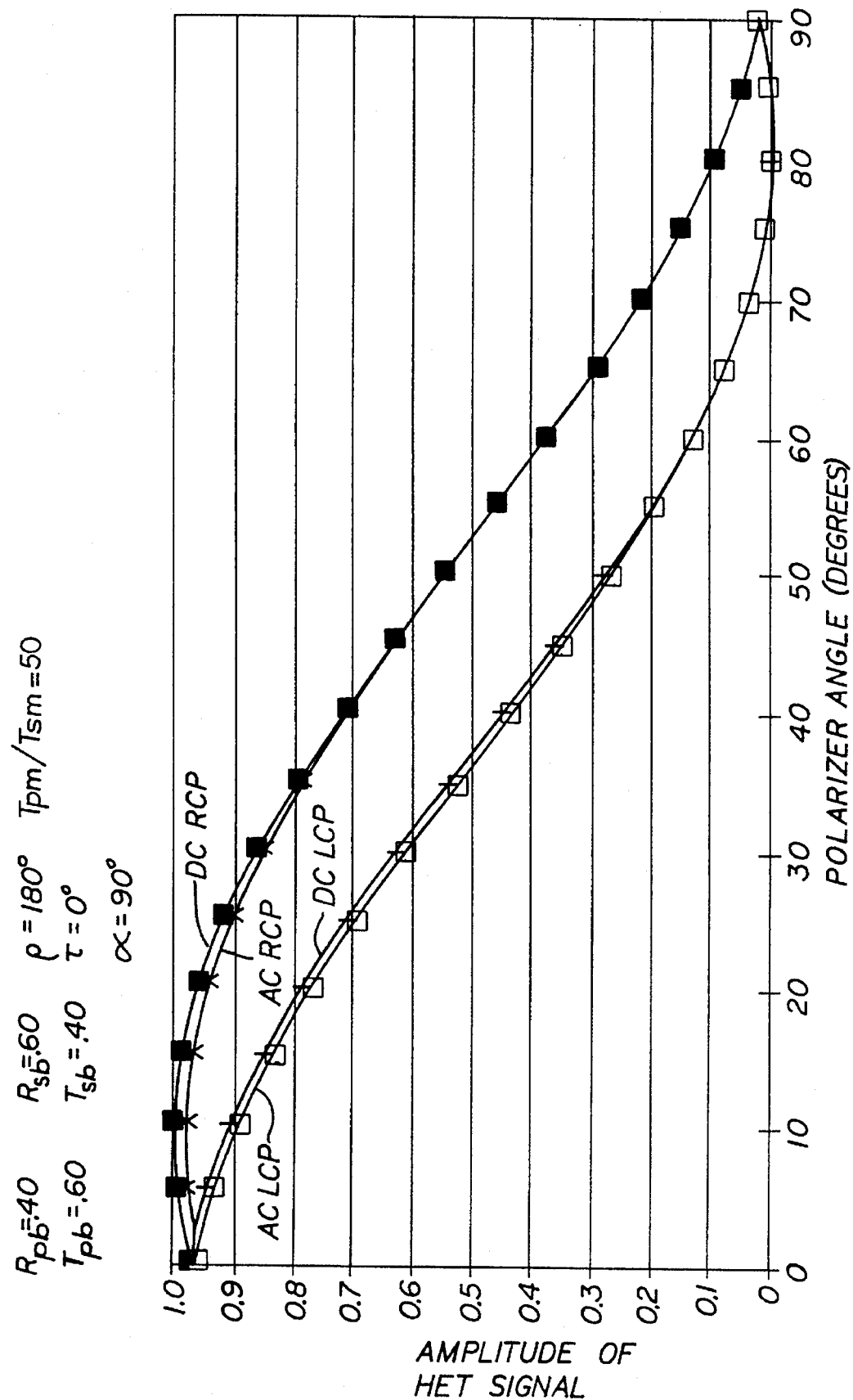

MULTIOSCILLATOR WITH COMBINED OPTICAL AND ELECTRONIC SIGNAL PROCESSING

BACKGROUND

1. Field of the Invention

The present invention relates to apparatus for processing the signals generated by a multioscillator. More particularly, this invention pertains to an output system of optical and electronic elements for providing separation of components of light beams and processing signals derived from the separated components for rotation rate measurement and cavity length control.

2. Description of the Prior Art

Laser gyroscopes employ two or more waves of electromagnetic energy that counterpropagate in a laser medium. Rotation of the gyroscope, induced by that of a platform to which it is strapped, will produce a difference in the round-trip times of the oppositely-propagating waves. Such difference depends upon the rate and amount of such rotation, and may be output as a frequency difference. In a two wave planar cavity system, a lock-in phenomenon, yielding no such frequency difference, may occur at low rates of rotation. Lock-in is believed to result from coupling between waves occasioned by factors such as backscattering of wave energy from elements within the optical path or cavity including, for example, mirrors or a Faraday rotator.

Early attempts to solve the lock-in problem for planar cavities have included separate all-mechanical and all-optical biasing of the counterpropagating beams away from the zero output frequency level. All-optical biasing involves the use of magneto-optic mirrors to subject the counterpropagating beams to different delay times, while all-mechanical biasing involves physical dithering (i.e. rotational oscillation) of the gyro block.

Each of the above-identified approaches possesses recognized shortcomings. For example, optical biasing that separates the lasing beams sufficiently in frequency to avoid lock-in can produce a frequency difference that is very large in comparison to the frequency difference caused by rotation. As a result, a small amount of drift can effectively mask the desired, measured signal output. All-mechanical biasing introduces the complexities of vibrational noise suppression.

An alternative approach to solving the lock-in problem involves rotation sensors that employ more than one pair of counterpropagating beams. A beam propagates in the clockwise direction about a non-planar cavity that includes left and right circularly-polarized modes, while another beam that includes right and left circularly polarized modes propagates in the counter-clockwise direction. The four modes are created by the combined effects of cavity design (out-of-planeness) and optical biasing (e.g., Faraday rotator). In particular, so-called reciprocal splitting of right and left-circularly polarized lasing modes results from cavity non-planarity. The magnitude of the frequency splitting is a function of the degree of non-planarity. Non-reciprocal splitting in frequency between modes of the same polarization propagating in opposite directions about the lasing cavity is produced by the introduction of, for example, a glass Faraday rotator into the cavity. Alternatively, such nonreciprocal splitting can be produced by the imposition of a magnetic field upon the plasma.

FIG. 1 is a gain vs. frequency plot illustrating the four modes within a single leg of a multioscillator. (Four consecutive legs are required to form the required out-of-plane lasing cavity. The helicities of the beams that propagate through the cavity reverse as the beams are reflected by corner mirrors into adjacent cavity legs.) The modes, shown in FIG. 1 superimposed upon the gain vs. frequency curve, are grouped into a pair of left circularly polarized modes (LCP) and a pair of right circularly polarized modes (RCP). The two pairs are located at either side of gain center. One mode of each of the above-identified pairs propagates clockwise ("c") and one propagates counterclockwise ("a") within the non-planar multioscillator cavity. The relationship of the four above-described modes provides the information required to (1) determine rotation rate and direction and (2) tune the lasing cavity on a continual basis.

The output of a four mode rotation sensing device is preferably a digital number or other signal representing the total amount of rotation experienced during a predetermined time period. Alternatively, a digital number or other signal may represent the present rate of rotation of the gyroscope. The rate of rotation is computed in accordance with the formula:

$$\Omega = L\lambda/8A[(\omega_4 - \omega_3) - (\omega_2 - \omega_1)] \quad (1)$$

where $\Omega$ is the rate of rotation about the sensitive axis of the gyro, L is the total path length, A is the area effectively enclosed within the path and $\lambda$ is the wavelength of the waves propagating within the laser gyroscope cavity. The amount of rotation is found by integrating the above equation with respect to time.

In accordance with the above, it is therefore essential to determine the characteristics of each of the four beams. However, this task is complicated by the properties of the required partially-transmissive output mirror through which the rotation-affected optical beams are transmitted. Such mirrors routinely attenuate the s and p components of obliquely-incident light beams to vastly differing degrees. As a result, the ability to distinguish the various modes after transmission of the counterpropagating beams through the output mirror is significantly complicated. More particularly, commonly used output mirrors cause a significantly greater reduction in the s component than in the p component of the electromagnetic field associated with each of the beams. As a consequence, upon transmission of each of the four beams into an output prism, each beam is characterized by a nearly-linear electromagnetic field polarization rendering the polarizations of the four beams nearly-indistinguishable.

The above-stated problem has been addressed by both all-optical and all-electronic approaches. U.S. Pat. No. 4,449,824 of Matthews entitled "Laser Gyro Output Optics Structure" discloses all-optical elements for separating the various beams. There, the undesired polarization components are eliminated from the various HET signals. As a result, a substantial amount of useful signal is also lost, rendering the system output vulnerable to noise. U.S. Pat. No. 5,116,132 of Mitchell et al. entitled "Ring Laser Gyroscope Output Optics Detection System" discloses all-electronic signal separation circuitry that imposes a ninety-degree phase shift to one set of heterodyne signals in order to extract the Sagnac effect-modulated Faraday frequency signals. However, the ability of the circuit to extract the Sagnac effect-modulated Faraday frequency signals is severely reduced at high rotation rates. At very low rates, lock-in, similar to that observed in two mode devices, can occur as the cavity length control signal derived from the Sagnac effect-modulated Faraday frequency signals is modulated at the slow gyro beat frequency.

SUMMARY OF THE INVENTION

The present invention addresses the foregoing and additional shortcomings of the prior art by providing, in a first aspect, apparatus for processing the information contained within the pairs of right and left circularly polarized lasing modes of light beams counterpropagating within a multioscillator. Such apparatus includes a partially-transmissive output mirror arranged with respect to the body of the multioscillator so that the s and p components of each of the beams undergo unequal degrees of attenuation upon transmission therethrough.

A prism is provided for receiving the beams transmitted through the output mirror and providing a pair of beam outputs in response. An arrangement of optical elements is preferentially fixed to the prism for altering the polarization states of the electromagnetic fields of incident light beams. A pair of photodiodes is provided, each arranged to receive a beam output and to provide an electrical signal in response. A circuit is provided for receiving the electrical signals and processing the electrical signals to provide HET signals.

In a second aspect, the invention provides apparatus for processing the information contained within the pairs of right and left circularly polarized lasing modes of light beams counterpropagating within a multioscillator after the beams have been transmitted through a substantially-planar, partially transmissive output mirror.

The output mirror is adjacent intersecting legs of the optical path of the multioscillator. A prism is provided for receiving the transmitted beams and for providing an optical output in response. A plurality of optical elements is preferentially arranged and fixed to the prism for altering the polarization states of the electromagnetic fields of incident light beams.

At least one photodiode is arranged to receive the optical output and to provide an electrical signal in response. A circuit is arranged to receive the output of such at least one photodiode and to provide distinct a.c. and d.c. HET signals in response.

In a third aspect, the invention provides an opto-electronic system for extracting distinct HET signals based upon the pairs of right and left circularly polarized lasing modes of two light beams counterpropagating within a multioscillator. Such beams undergo unequal attenuations of their s and p components upon transmission through an output mirror.

The system of the invention includes an optical assembly comprising a prism and a plurality of associated optical elements for receiving the transmitted beams and providing a pair of beam outputs in response. The optical elements are fixed to the prism and are chosen for preferentially altering the polarization states of the electromagnetic fields of incident light beams. A pair of photodiodes is provided. Each photodiode is arranged to receive a beam output and to provide an electrical signal in response. A circuit is provided for receiving the electrical signals and providing HET signals in response thereto.

The preceding and other features and advantages of the present invention will become further apparent from the detailed description that follows. Such detailed description is accompanied by a set of drawing figures. Numerals of the drawing figures, corresponding to those of the written description, point to the features of the invention. Like numerals refer to like features throughout both the written text and the drawing figures.

BRIEF DESCRIPTION OF THE DRAWINGS

FIG. 1 is a gain curve for a single leg of a multioscillator with the four lasing modes superimposed thereon;

FIG. 2 is a schematic diagram of a multioscillator including an output system in accordance with the invention;

FIG. 5 is a graph of the relationship between the relative HET optical intensities for right and left-circularly polarized light as a function of the orientation of the polarization axis of the polarizer of the invention in the plane of the s and p-polarization axes; and FIG. 6 is a block diagram of the electrical circuit of the invention for separating the a.c. and d.c. components of the HET signals for right and left circularly polarized light.

DETAILED DESCRIPTION

Figure 3:
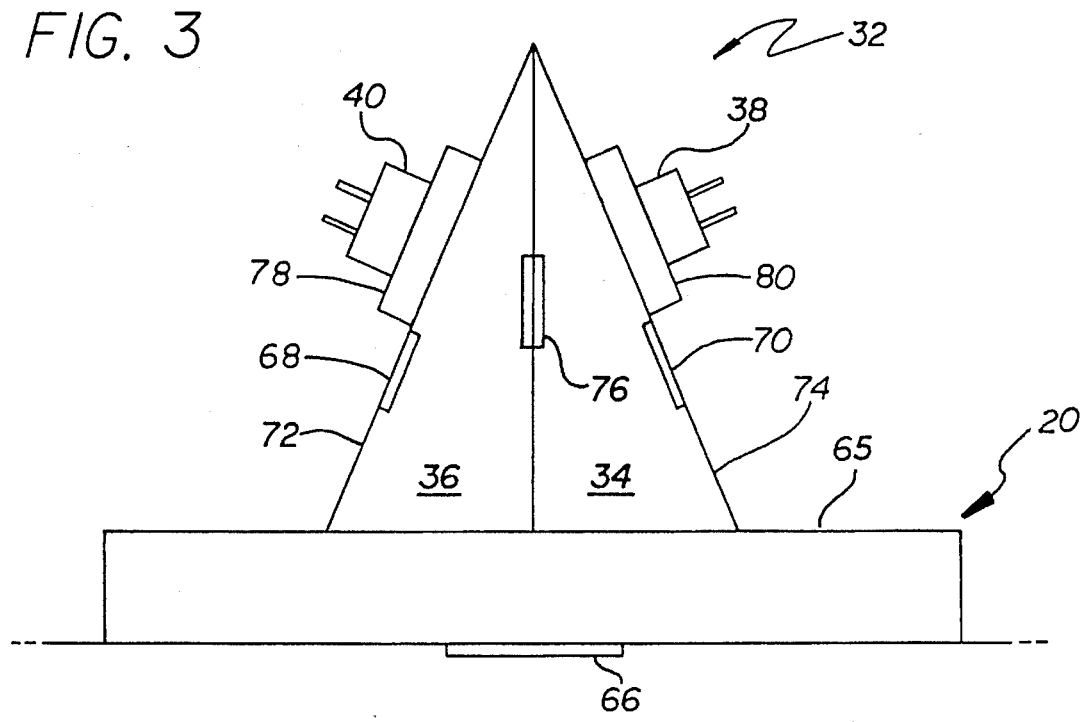
FIG. 3 is a cross-sectional view of an output prism and associated optical elements in accordance with the invention.

FIG. 2 is a schematic diagram of a multioscillator 8 including an output system 10 in accordance with the invention. The output system 10 employs both optical and electronic arrangements for detecting and decoding optical rotational rate information and for providing cavity length control.

The multioscillator 8 comprises a monolithic block or frame 12 fabricated of appropriate low thermal expansion material such as the ceramic glass marketed by Schott, a company of the Federal Republic of Germany, under the trademark "ZERODUR". It includes an optical pathway 14 comprising consecutive optical cavity legs denoted "A", "B", "C" and "D" as shown. Mirrors 16, 18, 20 and 22 are positioned at the intersections of the adjacent cavity legs. An active medium of excited Helium-Neon gas is provided by activation of a cathode 26 and anodes 24 and 28. Reciprocal splitting of the light beams traveling along the optical pathway 14 is occasioned by the nonplanar geometry of the block 12 that provides left and right reciprocal circularly polarized beams that propagate around the optical pathway 14. A Faraday rotator 30 provides non-reciprocal splitting, preferably on the order of one megahertz, between clockwise and anti-clockwise components of each set of left circularly polarized (LCP) and right circularly polarized (RCP) light beams as shown in FIG. 1.

In the invention, optical and electronic subsystems interact to generate HET outputs by a process that efficiently utilizes the optical energy output from the multioscillator 8. The optical portion of the output system 10 includes a prism 32 that includes a pair of upright symmetric prism components 34 and 36 arranged in back-to-back fashion. The details of construction of the prism 32, including a number of selectively positioned optical elements, are described in detail in conjunction with FIG. 3 below.

Photodetectors 38 and 40 are responsive to the intensities of optical signals processed by the prism 32 and its associated optical elements. They provide useful electronic outputs in response thereto. In FIG. 2, a first network 41 is shown comprising high-pass filters 42 and 44 in combination with a voltage divider network that includes center-tapped resistors 46 and 48 and amplifiers 50 and 52 delivers a.c. HET signals to a computer 54. The computer 54 employs the HET signals derived by the first network 41 to determine rotation rate and sense. The output of the amplifier 50 provides the a.c. HET output ($\omega_2 - \omega_1$) representative of the RCP light and the amplifier 52 provides the a.c. HET output ($\omega_4 - \omega_3$) for the LCP light that circulates within the optical pathway 14 of the multioscillator 8.

In FIG. 2, a second network 55 is shown comprising low-pass filters 56 and 58 that provide d.c. HET signals to a comparator 60. The comparator 60 drives an integrator 62 for providing, in conjunction with an offset voltage, a servoed cavity length control signal to an amplifier 64. The output of the amplifier 64 drives piezoelectric transducers mounted to the mirror 22 in such a way as to maintain cavity length control of the multioscillator. Piezoelectric transducers may also be mounted to other mirrors, such as the mirror 16, and be driven by the amplifier 64. The electrical circuitry for processing the optical outputs of the multioscillator 8 (provided by the prism 32 and associated optical elements) will be discussed in greater detail with reference to FIG. 6 below. It will be appreciated by those skilled in the art that output schemes need not be limited to rotation rate measurement by means of a.c. HET signals and cavity length control by means of d.c. HET signals. Rather, it is only significant in terms of the claimed invention that a useful scheme is provided for deriving the a.c. and d.c. HET signals.

FIG. 3 is a cross-sectional view of the prism 32. The prism 32 is fixed to the substrate 65 of the partially-transmissive output mirror 20. A mirror coating 66 comprising a stack of dielectric elements is fixed to the substrate 65. The mirror coating 66 tends to attenuate the component of an incident light beam that is perpendicular to the plane of the paper ("s" polarized light) to a disproportionate degree relative to the orthogonal component of that light that lies in or is parallel to the plane of the paper ("p" polarized light). Therefore, a circularly polarized beam of light that possesses p and s components of approximately equal amplitude within the optical pathway 14 appears nearly linearly polarized after passage through the output mirror 20. This process of quasi-linearization of the electromagnetic fields of right and left circularly polarized modes of each counterpropagating beam renders the modes essentially indistinguishable. This greatly complicates the generation of the HET signals required for rotation measurement and cavity length control purposes. The resultant change in beam polarization from nearly-circular (within the optical pathway 14 of the multioscillator 8) to nearly-linear complicates the evaluation of rotation rate information and cavity length control as it makes it more difficult for the system to distinguish among the four individual lasing modes illustrated in FIG. 1 after transmission of such modes through the output mirror 20.

The prism 32 plus optical elements 68, 70, 76, 78, and 80 are arranged to interact optically with the nearly-linearly polarized light that has passed through the output mirror 20, enhancing the optical output for later electronic processing to produce the desired HET signals. The prism 32 plus auxiliary optics accomplishes this by selectively imposing predetermined phase shifts between the s and p light of incident beams to produce optical inputs to the photodetectors 38 and 40 that allow straight-forward electronic separation into the various HET signals (after conversion to electronic signals by the photodetectors 38 and 40) by means of a first network 41 and a second network 55. Further, as will be seen, the prism 32 optically processes both s and p polarizations of the optical energy received from the multioscillator. This is in contrast to the all-optical system of U.S. Pat. No. 4,449,824, an intensity-based approach, which discards the s-component.

Phase shifting and polarization-related operations upon the output beams result in the various modes possessing distinct ellipticities so that the associated electronics 55 and 41 may readily generate rotation rate and cavity length control signals. (Note: Ellipticity $\phi$ is related to the magnitudes of the fields of the p and s components, $E_{pm}$ and $E_{sm}$ and to the transmissivity of the output mirror coating 66 with respect to p and s light, $T_{pm}$ and $T_{sm}$ as follows:

$$ctn\phi = \frac{E_{pm}}{E_{sm}} = \sqrt{\frac{T_{pm}}{T_{sm}}} \tag{1}$$

Photodetectors 38 and 40, fixed to the prism 32 via polarizers 80 and 78, provide unambiguous signals, related to the intensities of the modes lasing within the optical pathway 14, to the signal processing electronics of the first network 41 and the second network 55 illustrated in FIG. 2 and discussed in detail with reference to FIG. 6 below.

The triangular (in profile) prism 32 comprises a pair of right triangular prism components 34 and 36 arranged back-to-back to create a single upright assembly that is symmetrical and mounted adjacent the top surface of the output mirror 20. The substrate 65 of the mirror 20 is preferably formed of a low expansion ceramic such as ZERODUR or of silica glass, while the coating 66 comprises one or more layers of dielectric material.

Optical elements are selectively fixed to the prism 32 for creating predetermined effects. Such elements produce the various optical interactions (discussed below) that preferentially modify the s and p polarizations of the two beams output from the optical pathway 14 of the multioscillator 8 so that the optical information may be processed to produce the HET signals required for the measurement of rotation rate and direction of rotation and for the provision of cavity length control signals. First bounce reflection-retarders 68 and 70 are symmetrically positioned along corresponding faces 72 and 74 of the prism components 36 and 34 respectively. The reflection-retarders 68 and 70 are arranged to provide total reflection and to create predetermined phase shifts, $\propto_p$ and $\propto_s$, of the p and s light of incident beams. The first bounce reflection-retarders 68 and 70 may be of various compositions. In a preferred embodiment, the retarders 68 and 70 may comprise a multilayer dielectric (one or more layers) that employs total internal reflection at the air interface to obtain the p–s phase shift. An example of such a multilayer dielectric would be a 200 Angstrom coating of $TiO_2$. As an alternative embodiment one may employ a multilayer dielectric in which the p–s phase shift is generated by the layer design with negligible transmission. Finally, a multilayer dielectric with a top metal layer (e.g. gold) can produce the required p–s phase shift.

A beamsplitter 76 is located at the interface between the prism components 34 and 36. The beamsplitter 76 is designed to apportion incident light into reflected and transmitted components and to introduce associated phase shifts accordingly. Percentages of incident s-light corresponding to reflection coefficient $R_{sb}$ and to transmission coefficient $T_{sb}$ and percentages of incident p-light corresponding to reflection coefficient $R_{pb}$ and to transmission coefficient $T_{pb}$ are reflected from and transmitted through the beamsplitter 76 respectively. The beamsplitter 76 introduces phase shifts $\rho_{pb}$ and $\rho_{sb}$ into the reflected p and s light respectively and phase shifts $\tau_{pb}$ and $\tau_{sb}$ into transmitted p and s light respectively.

Polarizers 78 and 80 are fixed to the surfaces 72 and 74 of the prism 32. Each polarizers 78, 80 is characterized by a polarizer angle $\theta$ ($\theta$ defining an angular inclination from the plane of the paper). It will be shown below that, by adjusting the polarizer angle $\theta$ whereby the mix of s and p-polarized light passing through the polarizer is varied, the difference between the optical intensities of the HET signals detected at the photodetectors 38 and 40 can be adjusted. By employing the optical processing of the invention one needn't discard the s-component of the light output from the multioscillator 8. Rather, while "mixed" HET outputs will be incident upon each of the photodetectors 38 and 40, the "undesired" HET signals may be sufficiently separated in terms of intensity from the "desired" HET signals at each of the photodetectors 38 and 40 to permit their straightforward electronic separation thereafter. It shall further be shown that the intensity difference between the Faraday frequency signals for LCP and RCP light is maximum at a θ value of approximately forty-five (45) degrees. In a presently-preferred embodiment, the functions of the above-described polarization beamsplitters 78 and 80 are accomplished by sheets of the material marketed by Corning Glass Corporation under the trademark "POLARCOR" and product designation 8612. Such material generally comprises a proprietary composition of a glass impregnated with silver chloride.

An alternative embodiment of the present invention in which multilayer dielectric designs are employed for the first bounce reflection-retarders 68, 70, the prism beamsplitter 76 and the polarization beamsplitters 78 and 80, is disclosed and discussed in the Appendix that follows the discussion herein.

Figure 4:
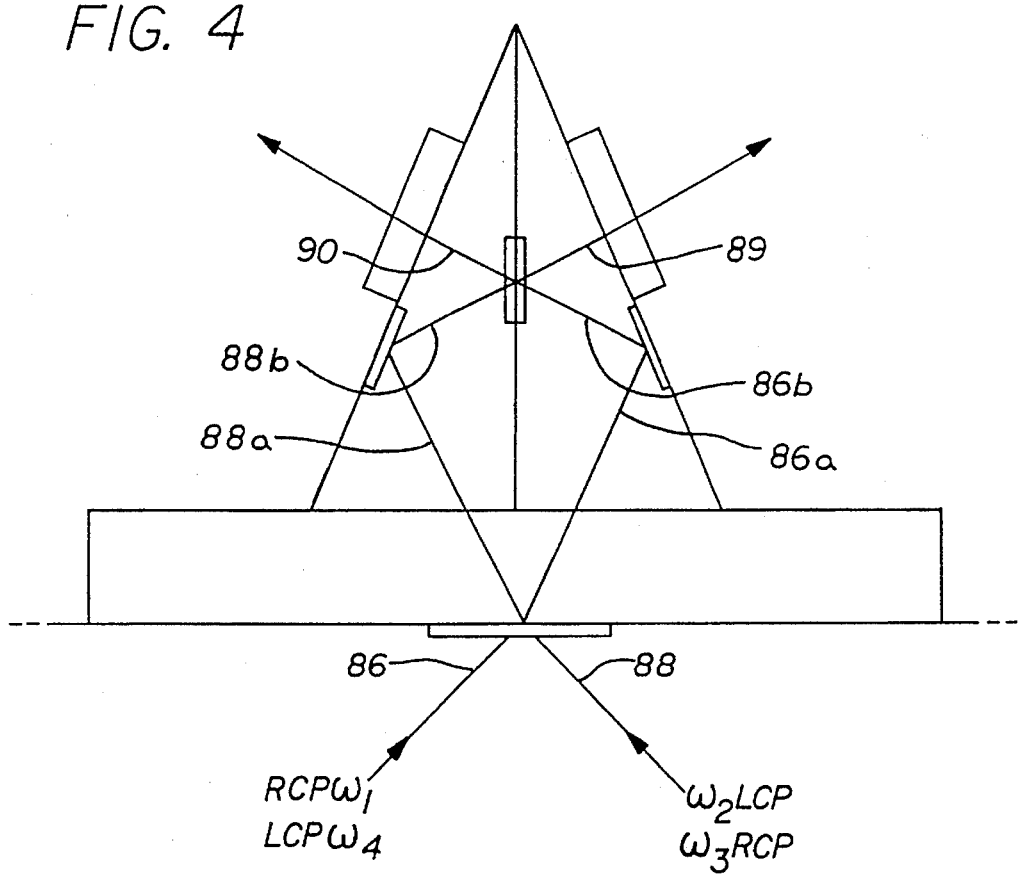
FIG. 4 is a view generally in accordance with the prior figure and including rays representing optical beams for illustrating the operation of such prism and elements.

FIG. 4 is an optical schematic diagram of the optical interactions of the prism 32 to assist the analysis that follows. Referring to that figure, beams 86 and 88 propagate clockwise and counterclockwise, respectively, within the optical pathway 14 of the multioscillator 8 and are incident upon the coating 66 of the partially-transmissive output mirror 20. The clockwise-propagating beam 86 (output from leg B of the optical pathway 14 as shown in FIG. 2) includes an RCP mode of frequency $\omega_1$ and an LCP mode of frequency $\omega_4$ while the counterclockwise propagating beam 88, output from adjacent leg A of the optical pathway 14, includes an LCP lasing mode at frequency $\omega_2$ and an RCP lasing mode at frequency $\omega_3$. As noted above, the helicities of lasing modes reverse as a beam is reflected from leg to leg of a closed optical pathway 14. This accounts for the reversal of the helicities of the modes of the counterclockwise propagating beam 88 when compared with the orientation of such lasing frequencies with respect to the gain curve of FIG. 1. (In FIG. 1 it is assumed that both counterpropagating beams are observed within the same leg of the optical pathway 14.)

It is to be noted that the invention contemplates an output scheme that is suitable when used in conjunction with a multioscillator block of so-called "typical" configuration. Such a multioscillator block includes a closed internal lasing cavity that comprises four (4) cavity legs of equal lengths. The cavity is arranged so that cavity legs form substantially equal angles ("fold angles") with respect to a pair of imaginary "fold lines" that join opposed light contact points (i.e. where the light beams contact mirrors). It follows from the above that the angles of incidence of each of the beams 86 and 88 with the mirror coating 66 will typically be between about thirty-five (35) and forty-five (45) degrees from normal. The ratio of p light intensity to s light intensity is a function of the angle of incidence of the beam with respect to the output mirror surface. Ratios of 50:1 and greater may be expected at incidence angles of 35 to 45 degrees while relatively little differential attenuation takes place near normal incidence.

Once the light has been transmitted through the mirror 20, the electromagnetic field associated with that mode becomes a function of the relative transmissivities of light perpendicular to the incident plane (s-polarized light) and that parallel to the incident plane (p-polarized light). A discussion of the optical transformations occasioned by the prism 32 will follow. This discussion will include a beam notation system in which reference is made to the multioscillator optical pathway 14 origins of the light beams as they pass through the prism 32. More precisely, the notation relates the light processed within the prism 32 to the beams 86 and 88 that propagate clockwise and counterclockwise within the optical pathway 14 of the multioscillator 8 prior to entering the prism 32. This is accomplished by the addition of an uncapitalized letter to the designated "originating beam". The output beams 89 and 90 will each be seen to include components that can ultimately be traced, through the combined effects of transmission through and reflection from the beamsplitter 76, to each of the beams 86 and 88 propagating within the optical pathway 14 of the multiosicllator 8.

Referring now to FIG. 4, each of the incident beams 86 and 88, comprising left and right circularly polarized modes that propagate helically within the optical pathway 14 of the multioscillator 8, is affected by the differential transmissivities of the mirror coating 66 with respect to p and s light. Typically, the transmissivity of p-polarized light is many times (e.g. on the order of 100:1) that of s-polarized light.

Upon transmission through the mirror coating 66, the electromagnetic field of each of the lasing modes illustrated in FIG. 1 assumes an ellipticity of $E_{pm}/E_{sm}$ where $E_{pm}$ is the amplitude of the electromagnetic field in the direction of the p-polarization (i.e. in the plane of the paper) and $E_{sm}$ is the amplitude of the electromagnetic field in the direction of the s-polarization. As discussed earlier, ellipticity is also equal to $\sqrt{\sqrt{T_{pm}/T_{sm}}}$ where $T_{pm}$ and $T_{sm}$ are the transmissivities of the mirror coating 66 with respect to incident p and s light respectively. Define the amplitudes of the electromagnetic fields of the right and left circularly polarized modes within the multioscillator cavity as $E_R$ and $E_L$ respectively (assuming that the difference in magnitude between nonreciprocally split mode pairs is negligible in view of the shape of the gain curve), and define φ so that:

$$\cos \phi = \sqrt{T_{pm}} \div \sqrt{T_{pm} + T_{sm}} \qquad (1)$$

$$\sin \phi = \sqrt{T_{sm}} \div \sqrt{T_{pm} + T_{sm}} \qquad (2)$$

The electromagnetic fields of the modes of the beams 86a and 88a (each of such segments being illustrated in FIG. 4) after transmission of the corresponding beams 86 and 88 through the mirror 20 and prior to incidence with the first bounce quarterwave retarders 68 and 70 are described as follows:

TABLE I

| Segment | Helicity | Frequency | $E_p$ | $E_s$ |
| --- | --- | --- | --- | --- |
| 86a | RCP | $\omega_1$ | $E_R{'} \cos \phi$ | $i\, E_R{'} \sin \phi$ |
| 88a | LCP | $\omega_2$ | $E_R{'} \cos \phi$ | $-i\, E_R{'} \sin \phi$ |
| 88a | RCP | $\omega_3$ | $E_L{'} \cos \phi$ | $i\, E_L{'} \sin \phi$ |
| 86a | LCP | $\omega_4$ | $E_L{'} \cos \phi$ | $-i\, E_L{'} \sin \phi$ |

The primed notations $E_R{'}$ and $E_L{'}$ indicate the amplitudes of the electromagnetic fields of the right and left circularly polarized modes as attenuated by passage through the output mirror 20. Frequency $\omega_1$ is associated with RCP mode 1 in leg B, frequency $\omega_2$ is associated with LCP mode 2 in leg A, frequency $\omega_3$ is associated with RCP mode 3 in leg A, and frequency $\omega_4$ is associated with LCP mode 4 in leg B. (The clockwise output beams are associated with leg B and the counterclockwise output beams are associated with leg A of the optical pathway 14 as called out in FIG. 2. (The alternative ordering of the output beam ellipticities with ascending frequencies is required by the output scheme of the invention.) Since $T_{pm}$ is much greater than $T_{sm}$, it can be seen that each of the above electromagnetic fields is nearly linear, oriented almost entirely along the p-axis with a very small s-component. Accordingly, signal processing at this point is quite difficult as modes are substantially indistinguishable.

The electromagnetic fields associated with the beam segments 86b and 88b after incidence of the beam segments 86a and 88a upon the first bounce quarter wave retarders 70 and 68 respectively are as follows:

TABLE II

| Seg. | Hel. | Freq. | $E_p$ | $E_s$ |
|---|---|---|---|---|
| 86b | LCP | $\omega_1$ | $E_R'\cos\phi\exp i\alpha_p$ | $iE_R'\sin\phi\exp i\alpha_s$ |
| 88b | RCP | $\omega_2$ | $E_R'\cos\phi\exp i\alpha_p$ | $-iE_R'\sin\phi\exp i\alpha_s$ |
| 88b | LCP | $\omega_3$ | $E_L'\cos\phi\exp i\alpha_p$ | $iE_L'\sin\phi\exp i\alpha_s$ |
| 86b | RCP | $\omega_4$ | $E_L'\cos\phi\exp i\alpha_p$ | $-iE_L'\sin\phi\exp i\alpha_s$ |

$\alpha=\alpha_p-\alpha_s$ represents the phase retardance created between the p and s components of the incident beams at each of the first bounce quarter wave retarders 68 and 70. Each of the retarders 68 and 70 is designed for total internal reflection of incident light with a ninety (90) degree phase shift between p and s components. By providing a ninety degree phase shift between s and p polarizations, such components become in-phase upon reflection. Accordingly, the light of the reflected beam segments 86b, 88b is now linearly polarized. As will become more clearly apparent below, such design of the retarders results in the generation of signals of maximum utility for generating distinguishable HET output signals.

After total reflection from the first bounce retarders 68 and 70, the redirected beam segments 86b and 88b are incident upon the beamsplitter 76. A fraction of the p-polarized light of each beam segment, defined by the beamsplitter reflection coefficient for p-polarized light, $R_{pb}$, is reflected from the beamsplitter 76. Likewise, a fraction of the s-polarized light, corresponding to the beamsplitter reflection coefficient, $R_{sb}$, is also reflected from the beamsplitter. Referring for a moment to the beam 86b, it can be seen that the fraction $R_{pb}$ of the p-polarized light and the fraction $R_{sb}$ of the s-polarized light of that beam are directed from the beamsplitter 76 to the polarizer 80. Reflection from the beamsplitter 76 introduces an additional phase retardance of $\rho=\rho_p-\rho_s$ between the s and p-polarized components of the reflected light.

Fractions of the p-polarized light and s-polarized light, represented by the transmission coefficients $T_{pb}$ and $T_{sb}$ respectively pass through the beamsplitter 76. Referring to FIG. 4, such portions of the beam segment 86b are then directed toward the polarizer 78. As in the case of light reflected from the beamsplitter 76, the p and s-polarized light experience a further phase retardation of $\tau=\tau_p-\tau_s$ upon transmission therethrough. (It should be noted that the phase retardances $\rho$ and $\tau$ discussed above are functions of the composition of the beamsplitter 76. In the invention, $\rho=\rho_p-\rho_s$ is preferably about 180 degrees while $\tau=\tau_p-\tau_s$ is zero. This assures that light after incidence with the beamsplitter 76, will remain linearly polarized. Accordingly, optical signal losses will be minimal as, while it is relatively easy to design a beamsplitter 76 for 50 percent reflection and 50 percent transmission of light of one polarization, p or s, it is quite difficult to design a 50/50 beamsplitter for both s and p light.)

In accordance with the above discussion, and the notation described above, the electromagnetic fields of light directed at the polarizers 78 and 80 along the beam segments 89 and 90 are as follows:

TABLE III

| Sg. | Fr. | $E_p$ | $E_s$ |
|---|---|---|---|
| 89 | $\omega_1$ | $E_R'\sqrt{R_{pb}}\cos\phi\exp[i(\alpha_p+\rho_p)]$ | $iE_R'\sqrt{R_{sb}}\sin\phi\exp[i(\alpha_s+\rho_s)]$ |
| 89 | $\omega_2$ | $E_R'\sqrt{T_{pb}}\cos\phi\exp[i(\alpha_p+\tau_p)]$ | $-iE_R'\sqrt{T_{sb}}\sin\phi\exp[i(\alpha_s+\tau_s)]$ |
| 89 | $\omega_3$ | $E_L'\sqrt{T_{pb}}\cos\phi\exp[i(\alpha_p+\tau_p)]$ | $iE_L'\sqrt{T_{sb}}\sin\phi\exp[i(\alpha_s+\tau_s)]$ |
| 89 | $\omega_4$ | $E_L'\sqrt{R_{pb}}\cos\phi\exp[i(\alpha_p+\rho_p)]$ | $-iE_L'\sqrt{R_{sb}}\sin\phi\exp[i(\alpha_s+\rho_s)]$ |
| 90 | $\omega_1$ | $E_R'\sqrt{T_{pb}}\cos\phi\exp[i(\alpha_p+\tau_p)]$ | $iE_R'\sqrt{T_{sb}}\sin\phi\exp[i(\alpha_s+\tau_s)]$ |
| 90 | $\omega_2$ | $E_R'\sqrt{R_{pb}}\cos\phi\exp[i(\alpha_p+\rho_p)]$ | $-iE_R'\sqrt{R_{sb}}\sin\phi\exp[i(\alpha_s+\rho_s)]$ |
| 90 | $\omega_3$ | $E_L'\sqrt{R_{pb}}\cos\phi\exp[i(\alpha_p+\rho_p)]$ | $iE_L'\sqrt{R_{sb}}\sin\phi\exp[i(\alpha_s+\rho_s)]$ |
| 90 | $\omega_4$ | $E_L'\sqrt{T_{pb}}\cos\phi\exp[i(\alpha_p+\tau_p)]$ | $-iE_L'\sqrt{T_{sb}}\sin\phi\exp[i(\alpha_s+\tau_s)]$ |

As mentioned earlier, each of the polarizers 78 and 80, mounted to faces 72 and 74 respectively of the output prism 32 is arranged so that the beam segments 90 and 89 are respectively incident. In accordance with the well-known expression for the electromagnetic field of a beam of light exiting a polarizer of polarization axis oriented at an angle $\theta$ in the plane of the p and s vectors, $$E(\theta)e^{i\phi}=E_p\cos\theta\exp i\phi_p+E_s\sin\theta\exp i\phi_s \qquad (2)$$

The intensity of the transmitted light can determined from the well-known expression $$|E(\theta)|^2=|E_p|^2\cos^2\theta+|E_s|^2\sin^2\theta+2|E_p||E_s|\sin\theta\cos\theta\cos(\phi_p-\phi_s) \qquad (3)$$

Now, substituting the expressions from Table III for $E_p$ and $E_s$ into equation 2, the following expressions are obtained for the electromagnetic fields of the four multioscillator modes after passage through the beamsplitter polarizers 80 and 78 respectively:

TABLE IV

| Frequency | $E_{80}(\theta)$ | $E_{78}(\theta)$ |
|---|---|---|
| $\omega_1$ | $E_R' \sqrt{R_1 - R_2}$ | $E_R' \sqrt{T_1 + T_2}$ |
| $\omega_2$ | $E_R' \sqrt{T_1 - T_2}$ | $E_R' \sqrt{R_1 + R_2}$ |
| $\omega_3$ | $E_L' \sqrt{T_1 + T_2}$ | $E_L' \sqrt{R_1 - R_2}$ |
| $\omega_4$ | $E_L' \sqrt{R_1 + R_2}$ | $E_L' \sqrt{T_1 - T_2}$ |

Where:

$R_1 = R_{pb} \cos^2\phi \cos^2\theta + R_{sb} \sin^2\phi \sin^2\theta$ $R_2 = -1/2 \sin 2\phi \sin 2\theta \sqrt{R_{pb}R_{sb}} \sin[(\alpha_p - \alpha_s) + (\rho_p - \rho_s)]$ $T_1 = T_{pb} \cos^2\phi \cos^2\theta + T_{sb} \sin^2\phi \sin^2\theta$ $T_2 = 1/2 \sin 2\phi \sin 2\theta \sqrt{T_{pb}T_{sb}} \sin[(\alpha_p - \alpha_s) + (\tau_p - \tau_s)]$ The photodetectors 38 and 40 provide electrical signal outputs in response to the intensities of the incident light. By making the appropriate substitutions and utilizing equation 3 above, it can be shown that the intensities of light incident upon the photodetectors 38 and 40, $|E_{38}(\theta)|^2$ and $|E_{40}(\theta)|^2$ (corresponding to the electromagnetic fields $E_{80}(\theta)$ and $E_{78}(\theta)$ output from the polarizers 80 and 78) respectively, are as follows (primed notations omitted from $E_R$ and $E_L$ from the above expressions for purposes of clarity):

TABLE V

DETECTED INTENSITIES

| HET | SIGNAL | $|E_{38}(\theta)|^2$ |
|---|---|---|
| DC | RCP | $E_R^2 (R_1 + T_1 - R_2 - T_2)$ |
| DC | LCP | $E_L^2 (R_1 + T_1 + R_2 + T_2)$ |
| AC | RCP | $+2E_R^2 \sqrt{R_1 - R_2} \sqrt{T_1 - T_2} \cos \Omega_R t$ |
| AC | LCP | $+2E_L^2 \sqrt{R_1 + R_2} \sqrt{T_1 + T_2} \cos \Omega_L t$ |

| HET | SIGNAL | $|E_{40}(\theta)|^2$ |
|---|---|---|
| DC | RCP | $E_R^2 (R_1 + T_1 + R_2 + T_2)$ |
| DC | LCP | $E_L^2 (R_1 + T_1 - R_2 - T_2)$ |
| AC | RCP | $-2E_R^2 \sqrt{T_1 + T_2} \sqrt{R_1 + R_2} \cos \Omega_R t$ |
| AC | LCP | $-2E_L^2 \sqrt{T_1 - T_2} \sqrt{R_1 - R_2} \cos \Omega_L t$ |

Where:

$\Omega_R = \omega_2 - \omega_1$ $\Omega_L = \omega_4 - \omega_3$, the Faraday frequencies It should be noted that $R_2$ and $T_2$ are defined, in part, in terms of the optical element design parameters $\alpha(=\alpha_p - \alpha_s)$, $\rho(=\rho_p - \rho_s)$ and $\tau(=\tau_p - \tau_s)$. Each of such design parameters appears in a sine expression. Thus, both $R_2$ and $T_2$ attain maximum values when the following conditions are simultaneously satisfied: $\alpha = 90$ degrees; $\rho = 180$ degrees; and $\tau = 0$ degrees. Referring to the expressions of Table V for detected intensities corresponding to HET signals, it is noted that the foregoing conditions maximize the difference between the RCP and LCP of the d.c. and a.c. components of HET signals incident upon the photodetectors 38 and 40 with the RCP component exceeding the LCP component detected at the photodetector 40 and vice versa at the photodetector 38. (Note: It is well understood by those skilled in the art that energy conservation dictates that the phases of the HET amplitudes at frequencies $\Omega_R$ and $\Omega_L$ at both photodiodes be 180 degrees out-of-phase. This accounts for the sign differences existing between $|E_{38}(\theta)|^2$ and $|E_{40}(\theta)|^2$.)

A mathematically-convenient case for exploration of the implications of the above analysis of light intensities at the photodetectors 38 and 40 follows. Accompanying graphs of data will then substantiate and extend the implications of the analysis. The degree of separation of the intensities of the HET signals for left and right circularly polarized light will be seen to be greatest in the region of $\theta = 45$ degrees. It is the difference in intensity between the right and left circularly polarized outputs that allows one to work with the beams of light. Stated in another way, the present invention provides a significant differential in intensity between the RCP and LCP HET intensities for straight-forward downstream electronic processing to obtain the desired HET outputs.

The following expressions (based upon Table V) rely upon the following assumptions: beamsplitter 76 parameters ($R_{pb}$, $R_{sb}$, $T_{pb}$ and $T_{sb}$) each 0.50; 90 degree phase shifts at first bounce coatings 68 and 70 ($\alpha_p - \alpha_s = 90$ degrees); one hundred and eighty (180) degree phase shifts upon reflection from the beamsplitter 76 ($\rho_p - \rho_s = 180$ degrees); and 0 degree phase shifts upon transmission through beamsplitter 76 ($\tau_p - \tau_s = 0$ degrees).

Utilizing the above-identified parameters, the equations of Table V for detected intensities reduce to the following form when beamsplitter polarizers 78 and 80 are employed with polarization axes oriented at 45 degrees in the plane of the s and p axes ($\theta = 45$):

TABLE VI

| HET SIGNAL | $|E_{38}(45°)|^2$ |
|---|---|
| DC RCP | $½ E_R^2 (1 - \sin 2\phi)$ |
| DC LCP | $½ E_L^2 (1 + \sin 2\phi)$ |
| AC RCP | $+½ E_R^2 (1 - \sin 2\phi) \cos \Omega_R t$ |
| AC LCP | $+½ E_L^2 (1 + \sin 2\phi) \cos \Omega_L t$ |
| | $|E_{40}(45°)|^2$ |
| DC RCP | $½ E_R^2 (1 + \sin 2\phi)$ |
| DC LCP | $½ E_L^2 (1 - \sin 2\phi)$ |
| AC RCP | $-½ E_R^2 (1 + \sin 2\phi) \cos \Omega_R t$ |
| AC LCP | $-½ E_L^2 (1 - \sin 2\phi) \cos \Omega_L t$ |

From the above, it can be seen that by employing polarizers 78 and 80 with polarization axes oriented at 45 degrees within the plane that includes the s and p axes, the optical intensity detected at the photodetector 38 is characterized by d.c. and a.c. HET signals for left-circularly polarized light that exceed the corresponding HET signals for right-circularly polarized light while the opposite situation applies with regard to the optical signal incident upon the photodetector 40. This of course, follows from the fact that $\sin 2\phi$ is a positive value between 0 and 1.

The preceding mathematical observation is further borne out by the graph of FIG. 5 which presents data derived through computer simulation of the detected intensity equations of Table V. Such graph illustrates the HET amplitudes the circularly polarized modes of the optical signal incident upon the photodetector 40 as a function of the angle $\theta$ of the polarizer-beamsplitter 78. The data is based upon the following parameters: $T_{pm}/T_{sm}=50$; $R_p=0.40$; $T_{pb}=0.60$; $R_s=0.60$; $T_{sb}=0.40$; $\rho=\rho_p-\rho_s=180$ degrees; $\tau=\tau_p-\tau_s=0$ degrees; and $\alpha=\alpha_p-\alpha_s=90$ degrees.

As can be observed from the graph of FIG. 5, a θ-dependent difference exists between the optical HET intensities associated with the left and right-circularly polarized modes of light immediately prior to incidence upon the photodetector 40. Moreover, the graph shows that the maximum difference in intensity occurs in the region of θ=45 degrees. The graph demonstrates that both the d.c. and a.c. HET signals for the right-circularly polarized modes exceed those for the left-circularly polarized modes throughout the 0-to-90 degree range of θ. Moreover, referring to the equations of Table V for detected intensity, it can be appreciated that a like graph directed to the light incident upon the photodetector 38 would yield similarly-shaped curves with the intensities of the HET signals associated with left-circularly polarized light exceeding those of the signals associated with right-circularly polarized light. This may be confirmed by noting the symmetry in the corresponding expressions for right and left-circularly polarized light.

As stated above, in the invention, optical signal processing results in the generation of signal outputs from each of the photodetectors 38 and 40 containing a.c. and d.c. HET information for both the left-circularly polarized and right-circularly polarized modes. The different polarizations can be readily distinguished and the electronic processing thereof simplified without the diminution of optical signal intensity required by the all-optical system of U.S. Pat. No. 4,449,824. (The prior art system essentially operates at θ=82 degrees where the HET amplitude of the undesired signal is reduced to zero. Referring to FIG. 5, the HET amplitude of the "wanted" signal at θ=82 degrees is reduced from about 0.62 (at θ=45 degrees) to about 0.08. Thus the magnitude of desired output would be only one-eighth of that obtained by the present invention were one to employ the prior art teaching.)

The signals output from the photodetectors 38 and 40 are then applied to the first network 41 and the second network 55, previously disclosed in FIG. 2, for separation of the HET signals. FIG. 6 is a block diagram of this electronic portion of the output system 10 that acts, in conjunction with the previously-described optical processing system including the prism 32 and associated optical elements. The concept of such a "mixed" system is in contrast to either the all-optical signal separation system of U.S. Pat. No. 4,449,824 or the all-electronic system of U.S. Pat. No. 5,116,132. By employing a mixed approach in which signal separation is accomplished by both optical and electronic processes the present system obtains the benefits associated with increased optical signal strength (minimizing the impact of noise) along with the avoidance of possible lock-in at low rates and performance reduction at high rates associated with all-electronic signal separation processes.

The relatively-simple and straightforward electronic signal processing apparatus of the invention is shown in FIG. 6. As previously mentioned, the electronic signal processing portion of the apparatus includes a first network 41 comprising high-pass filters 42 and 44 in combination with a voltage divider network represented by center-tapped resistors 46 (apportioning between resistance values $R_1$ and $R_2$ as shown) and 48 (apportioning the resistance values between $R_3$ and $R_4$ as shown) and amplifiers 50 and 52 for providing signals to a computer (not shown). The aforementioned network provides the a.c. RCP ad LCP HET signals for calculation of rotation rate and direction of rotation.

The second network 55 is provided for generating cavity length control signals based upon the d.c. HET signals for RCP and LCP light. The resultant control signal is applied to transducers mounted to the mirror 22. The network 55 includes low-pass filters 56 and 58, a comparator 60 and an integrator 62.

In operation, the low-pass filters 56 and 58 block the a.c. HET signals detected at the photodetectors 38 and 40 applying those d.c. HET signals to the comparator 60. Referring to the diagram of FIG. 1, the signal output from the comparator 60 is proportional to the difference between the d.c. levels of the HET signals for left and right-circularly polarized light, providing a reasonably accurate indication of the positions of the left and right circularly polarized modes in relation to the gain curve. This signal is then utilized to modulate the position of the mirror 22 to adjust the length of the cavity 14 in accordance with well-established techniques.

The high-pass filters 42 and 44 of the first network 41 block the d.c. components of the outputs of the photodetectors 40 and 38 respectively. The a.c. HET components for the two circularly polarized modes are provided at the outputs of the amplifiers 50 and 52. The input to the amplifier 50 may be analyzed as follows where numerals in parentheses refer to voltage values at the input or output of corresponding circuit elements shown in FIG. 6:

$$HET(50)=(R_2/(R_1+R_2))HET(42)+(R_1/(R_1+R_2))HET(44)$$

Due to the conservation of energy, this may be expanded as follows:

$$HET(50)=(R_2\div(R_1+R_2))[AHET(\Omega_R)+BHET(\Omega_L)]+(R_1\div(R_1+R_2))[-BHET(\Omega_R)-AHET(\Omega_L)]$$

Where A and B are coefficients derived from the initial partial optical separation of the HET's. If $R_2B-R_1A=0$, the contribution of HET $(\Omega_L)$ at (50) becomes zero and HET $(50)=K_1 HET(\Omega_R)$.

Using analogous reasoning, it can be shown that $HET(52)=K_2 HET(\Omega_L)$. The outputs of the amplifiers 50 and 52 are applied to the computer for determining rotation rate. Accordingly, and in contrast to the prior art, the undesired HET signal component is only eliminated after completion of optical signal processing based upon the entire content of the available optical signal.

Thus, the present invention is seen to provide an improved apparatus for performing the necessary signal separation required to analyze the output of a multioscillator and to provide cavity length control. By applying the mixed system of the present invention, one is able to realize greater accuracy at less cost than can be achieved by prior art systems. By performing only a portion of the signal separation optically, one preserves a significant amount of the desired optical signal intensity prior to conversion to electrical form to thereby minimize the significance of noise. At the same time, the electronic circuitry for completing the signal separation process is relatively simple and straightforward, assuring an economically viable device.

While this invention has been described with reference to its presently preferred embodiment, it is not limited thereto. Rather, this invention is limited only insofar as defined by the following set of patent claims and includes within its scope all equivalents thereof.

APPENDIX

An alternative embodiment of the prism 32 of the invention is defined and discussed below. Such embodiment is characterized by the use of multilayer dielectric designs for the first bounce reflection-retarders 68 and 70, the prism beamsplitter 76 and the polarization beamsplitter 78 and 80.

OPTICAL ELEMENT DESIGNS (A) FIRST BOUNCE QUARTERWAVE REFLECTION RETARDERS 68 and 70
(B) PRISM BEAMSPLITTER 76
(C) POLARIZATION BEAMSPLITTERS 78 and 80

| LAYER # | | (A) | (B) | (C) |
|---|---|---|---|---|
| 1 | H | 482 | 500 | 295 |
| 2 | L | 1000 | 1600 | 1185 |
| 3 | H | 518 | 500 | 591 |
| 4 | L | 1071 | | 1185 |
| 5 | H | 548 | | 591 |
| 6 | L | 1135 | | 1185 |
| 7 | H | 579 | | 606 |
| 8 | L | 1198 | | 1247 |
| 9 | H | 609 | | 622 |
| 10 | L | 1262 | | 1247 |
| 11 | H | 639 | | 622 |
| 12 | L | 1326 | | 1247 |
| 13 | H | 669 | | 622 |
| 14 | L | 1390 | | 1247 |
| 15 | H | 699 | | 622 |
| 16 | L | 1454 | | 1247 |
| 17 | H | 729 | | 622 |
| 18 | L | 1456 | | 1247 |
| 19 | H | 730 | | 622 |
| 20 | L | 1456 | | 1247 |
| 21 | H | 730 | | 622 |
| 22 | L | 1456 | | 1247 |
| 23 | H | 730 | | 622 |
| 24 | L | 1456 | | 1247 |
| 25 | H | 730 | | 606 |
| 26 | L | 1456 | | 1185 |
| 27 | H | 730 | | 591 |
| 28 | L | 1456 | | 1185 |
| 29 | H | 730 | | 591 |
| 30 | L | 1456 | | 1185 |
| 31 | H | 730 | | 295 |
| 32 | L | 1456 | | |
| 33 | H | 730 | | |

PHYSICAL LAYER THICKNESSES IN ANGSTROMS
ANGLE OF INCIDENCE (DEGREES)

| (A) | (B) | (C) |
|---|---|---|
| 43.49 | 25.24 | 45 |

The incident medium is fused silica with an index of refraction of 1.46. The first bounce coatings are total reflectors while the other two coatings are symmetric designs with fused silica as the exit medium. The high index layer H is $TiO_2$ (index 2.39) and the low index layer L is $SiO_2$ (index 1.48). The first layer (labeled "1") coated on the substrate is, in each of the listed cases, $TiO_2$.

The coating for the reflection retarders has a linear chirp in the thicknesses of the bottom seventeen (17) layers and a quarter wave stack at 633 nm for the top 16 layers. The reflection-retarders are designed for reflectivity in excess of 99 percent and phase retardances (p minus s) of 90 degrees. A two (2) percent increase or decrease in layer thickness from nominal design value produces an 85 degree phase retardance. As an alternative to the above-described multilayer coating design, the reflection retarders may be formed of a 200 Angstrom thick layer of $TiO_2$ that provides total internal reflection.

The prism beamsplitter coating is designed for a 58:42 split in $R_{sb}$ to $T_{sb}$ for s polarized light and a 42.58 split in $R_{pb}$ to $T_{pb}$ for p polarized light. A layer thickness deviation of ±5 percent alters the beamsplitter ratios by about one percent while maintaining the designed 180 degrees of p–s phase retardance to within two degrees.

The polarization beamsplitter coatings comprise quarter wave stacks in the central seventeen (17) layers at 536 nm. The top seven (7) and bottom seven (7) layers are shortened. The polarization beamsplitter design transmits at least 98 percent p-polarized light over the wavelength of 600 to 660 nm and is designed to work well between angles of incidence of 41 and 54 degrees at 633 nm.

What is claimed is:

1. Apparatus for processing the information contained within the pairs of right and left circularly polarized lasing modes of light beams counterpropagating within a multioscillator comprising, in combination:

a) a partially-transmissive output mirror arranged with respect to the body of said multioscillator so that the s and p components of each of said beams undergo unequal degrees of attenuation upon transmission therethrough;

b) a prism for receiving said beams transmitted through said mirror and providing a pair of beam outputs in response thereto;

c) an arrangement of optical elements including a plurality of optical coatings for interacting with said transmitted light beams, said elements being fixed to said prism for altering the polarization states of the electromagnetic fields of said transmitted light beams;

d) each of said optical coatings being arranged to provide a predetermined phase shift between the s and p components of said transmitted light beams;

e) a pair of photodiodes, each being arranged to receive a beam output including both right and left circularly polarized light and to provide an electrical signal in response thereto; and f) a circuit for receiving said electrical signals and processing said signals to provide HET outputs.

2. Apparatus as defined in claim 1 wherein said optical elements further include a pair of polarizers for selectively mixing the s and p components of incident light.

3. Apparatus as defined in claim 2 wherein said optical elements further include:

a) a pair of retarders; and b) each of said retarders is located in advance of a polarizer along a predetermined path of transmission of light through said prism.

4. Apparatus as defined in claim 3 wherein the polarization axis of each of said polarizers is arranged to provide a predetermined difference in the amplitudes of the HET signals for right and left circularly polarized light.

5. Apparatus as defined in claim 4 wherein the polarization axis of each of said polarizers is oriented at approximately 45 degrees.

6. Apparatus as defined in claim 5 further characterized in that said prism is of symmetrical triangular shape comprising a pair of upright triangular prism components arranged back-to-back whereby their hypotenuse surfaces form inclined surfaces of said symmetrical triangular shape.

7. Apparatus as defined in claim 1 wherein said circuit comprises a pair of networks, a first network being arranged to extract d.c. HET signals for left and right-circularly polarized light and a second network being arranged to extract a.c. HET signals for left and right-circularly polarized light.

8. Apparatus as defined in claim 7 wherein said first network includes a pair of low-pass filters and said second network includes a pair of high-pass filters.

9. Apparatus as defined in claim 8 wherein said second network also includes a voltage divider network.

10. Apparatus as defined in claim 1 further characterized in that:
   a) said multioscillator includes a block having four intersecting straight channels that form a closed internal cavity;
   b) said light beams counterpropagate within said closed cavity;
   c) said channels are of substantially equal lengths; and
   d) the fold angles of said cavity are substantially equal.

11. Apparatus for processing the information contained within the pairs of right and left circularly polarized lasing modes of light beams counterpropagating within a multioscillator after said beams have been transmitted through a substantially-planar, partially transmissive output mirror comprising, in combination:
   a) said output mirror being adjacent intersecting legs of the optical path of said multioscillator;
   b) a prism for receiving said transmitted beams and providing an optical output comprising a pair of beams, each of said beams including right and left circularly polarized light in response thereto;
   c) a plurality of optical elements arranged and fixed to said prism for altering the polarization states of the electromagnetic fields of incident light beams;
   d) a pair of photodiodes arranged to receive said optical output and to provide electrical signals in response thereto; and
   e) a circuit arranged to receive the output of said photodiodes and to provide distinct HET outputs indicative of said right and left circularly polarized modes in response thereto.

12. Apparatus as defined in claim 11 wherein:
   a) said optical elements include a plurality of prism coatings; and
   b) each of said coatings provides a predetermined phase shift between the s and p components of incident light.

13. Apparatus as defined in claim 12 wherein said optical elements include at least one polarizer arranged to obtain a predetermined mix of s and p components of said optical output.

14. Apparatus as defined in claim 13 wherein said optical elements further include:
   a) at least one retarder; and
   b) said at least one retarder is located in advance of a polarizer along a predetermined path of transmission of light through said prism.

15. Apparatus as defined in claim 14 wherein the polarization axis of said at least one polarizer is arranged to provide a predetermined difference between the intensities of right and left circularly polarized components of said optical output.

16. Apparatus as defined in claim 15 wherein said polarization axis is oriented at approximately 45 degrees.

17. Apparatus as defined in claim 11 further characterized in that:
   a) said prism is of triangular shape comprising a pair of upright right triangular prism components arranged back-to-back whereby their hypotenuse surfaces form the inclined surfaces of said symmetrical triangular shape; and
   b) said apparatus includes a pair of output polarizers symmetrically affixed to said hypotenuse surfaces of said prism.

18. Apparatus as defined in claim 11 further characterized in that:
   a) said multioscillator includes a block having four intersecting straight channels that form a closed internal cavity;
   b) said light beams counterpropagate within said closed cavity;
   c) said channels are of substantially equal lengths; and
   d) the fold angles of said cavity are substantially equal.

19. An opto-electronic system for extracting distinct HET output based upon the pairs of right and left circularly polarized lasing modes of two light beams counterpropagating within a multioscillator after unequal attenuation of the s and p components of each of said two beams upon transmission through an output mirror, said system comprising, in combination:
   a) an optical assembly comprising a prism and a plurality of associated optical elements arranged with respect to said prism for receiving said transmitted beams and providing a pair of beam outputs, each of said beam outputs including both left and right circularly polarized light, in response thereto;
   b) said optical elements being fixed to said prism and chosen for altering the polarization states of the electromagnetic fields of incident light beams;
   c) a pair of photodiodes, each being arranged to receive a beam output including both left and right circularly polarized light and to provide an electrical signal in response thereto; and
   d) a circuit for receiving said electrical signals and providing a left circularly polarized light HET output and a right circularly polarized light HET output in response thereto.

20. A system as defined in claim 19 wherein said plurality of optical elements includes at least one retarder fixed to said prism.

21. A system as defined in claim 20 wherein said plurality of optical elements includes a beamsplitter fixed to said prism.

22. A system as defined in claim 21 further characterized in that said at least one retarder is arranged to provide a ninety degree phase shift between the s and p components of incident light beams.

23. A system as defined in claim 22 wherein said beamsplitter is arranged to transmit light with a first predetermined phase shift between the s and p component thereof and to reflect light with a second predetermined phase shift between the s and p components thereof.

24. A system as defined in claim 23 further including:
   a) a pair of polarizers fixed to said prism;
   b) a pair of retarders; and
   c) each of said retarders is located in advance of and separated from a polarizer along a predetermined path of transmission of light through said prism.

25. A system as defined in claim 24 further characterized in that said prism is of symmetrical triangular shape comprising a pair of upright right triangular prism components arranged back-to-back whereby their hypotenuse surfaces form the inclined surfaces of said symmetrical triangular shape.

26. A system as defined in claim 25 wherein said polarizers are fixed symmetrically upon the hypotenuse surfaces of said prism.

27. A system as defined in claim 26 wherein the polarization axis of each of said polarizers is arranged to output right and left circularly polarized light of predetermined intensity differences.

28. A system as defined in claim 27 wherein the polarization axis of each of said polarizers is oriented at approximately 45 degrees.

29. A system as defined in claim 19 wherein said circuit comprises a pair of networks, a first network being arranged to extract d.c. HET signals for left and right-circularly polarized light and a second network being arranged to extract the a.c. HET signals for left and right-circularly polarized light.

30. A system as defined in claim 29 wherein said first network includes a pair of low-pass filters and said second network includes a pair of high-pass filters.

31. A system as defined in claim 30 wherein said second network also includes a voltage divider network.

32. A system as defined in claim 19 further characterized in that:
  a) said multioscillator includes a block having four intersecting straight channels that form a closed internal cavity;
  b) said light beams counterpropagate within said closed cavity;
  c) said channels are of substantially equal lengths; and
  d) the fold angles of said cavity are substantially equal.

* * * * *